United States Patent [19]

Itou et al.

[11] Patent Number: 4,544,380
[45] Date of Patent: Oct. 1, 1985

[54] AIR CONDITIONER FOR A COATING BOOTH

[75] Inventors: Zyouzi Itou; Synith Akiyama, both of Aichi, Japan

[73] Assignee: Toyota Jidosha Kabushiki Kaisha, Toyota, Japan

[21] Appl. No.: 509,381

[22] Filed: Jun. 30, 1983

[30] Foreign Application Priority Data

Dec. 17, 1982 [JP] Japan ............................... 57-221604

[51] Int. Cl.$^4$ ............................................. B01D 47/06
[52] U.S. Cl. .......................................... 55/80; 55/89; 55/93; 55/233; 55/DIG. 46
[58] Field of Search .................. 55/80, 84, 90, 93, 89, 55/223, 231, 233, 258–260, DIG. 46; 261/141, DIG. 34, DIG. 76

[56] References Cited

U.S. PATENT DOCUMENTS

| | | | |
|---|---|---|---|
| 899,289 | 9/1908 | Braemer | 55/90 |
| 2,093,936 | 9/1937 | Spielmann | 261/DIG. 34 |
| 2,107,268 | 2/1938 | Avery et al. | 261/DIG. 34 |
| 2,250,260 | 7/1941 | Fowler | 55/90 |
| 4,203,935 | 5/1980 | Hackenios | 55/90 X |

*Primary Examiner*—Charles Hart
*Attorney, Agent, or Firm*—Oblon, Fisher, Spivak, McClelland & Maier

[57] ABSTRACT

An air conditioner for a coating booth is constructed so as to intake the air through a filter for eliminating dust, to heat the air by a plate fin coil heater to the extent that it is not excessively saturated, to atomize the steam directly into the air via a steam atomizing tube, to contact the air including the atomized steam with water flowing down on the surfaces of the wet walls, to make the recirculating water absorb the steam for giving energy for humidifying to the water, to humidify the air by contacting the flowing water and to feed the humidified air through an eliminator to a coating booth at a temperature controlled by another plate fin coil heater.

8 Claims, 7 Drawing Figures

AIR CONDITIONER FOR A COATING BOOTH

BACKGROUND OF THE INVENTION

1. Field of the Invention:

This invention relates to an air conditioner which supplies air with controlled specified temperature and humidity to a coating booth, and a method for conditioning the air thereby.

Generally the finishing quality of a coating in a coating booth highly depends upon the temperature and humidity of the air to be fed into the coating booth. Therefore, especially in the case of, for example, a body of an automobile or the like which is required to have a high quality for the paint coating, not only is dust in the air supplied to the coating booth eliminated, but the temperature and the humidity of the air are also strictly controlled within specific limits.

Accordingly, this invention relates to an improvement in the air conditioner for the coating booth for an automobile body or the like which requires a high quality for the coating thereof.

2. Description of the Prior Art:

In a conventional air conditioner for controlling the air to be supplied to a coating booth within predetermined temperature and humidity limits, dust in the air is first eliminated by a filter. The air is then transported past a heater to transmit heat to the air. Subsequently the air thus heated goes by articles, called "wet wall units", on the surfaces of which heated water is flowing down from the top to the bottom of the articles. The air is humidified due to the contact of the air with the heated water flow. Subsequently the air is again heated by passing through another plate fin coil heater within which steam flows.

In order to humidify the air to a predetermined humidity in the humidifying step, it is necessary to heat the water which flows down the wet walls to a predetermined temperature. Normally the heated water flowing down the surfaces of wet wall units is recirculated for energy-savings. Thus, a predetermined amount of the energy for heating the recirculating water is necessary for humidifying the air passing by. The smaller the ratio of recirculating water to air which passes by the wet walls, the higher the temperature of the recirculating water should be. However, since the recirculating water is heated in a recirculating water tank where the water is accumulated after flowing down the wet walls, there occurs a temperature difference for the heated water between the upper portion of the wet wall where the recirculating water starts flowing down and the lowermost portion of the wet wall. This temperature difference can become so large that to ensure the humidification of the air even at the lowermost portion of the wet walls, the initial temperature of the recirculating water must be so high that the air which passes through the upper portion of the wet wall is excessively humidified and reaches a supersaturated state. Thus, fog-like water droplets are produced in the air, and the temperature and humidity of the air cannot be sufficiently controlled. Further, water droplets will precipitate in a duct leading to the coating booth. Therefore, a large amount of recirculating water must normally be used for reducing the temperature difference between the upper portion and the lowermost portion of the wet walls from which the recirculating water starts flowing down. Therefore, according to this method, a large amount of energy is wasted for heating the large amount of water.

SUMMARY OF THE INVENTION

Accordingly, one object of the present invention is to provide an air conditioner for a coating booth wherein the air to be fed to the coating booth will be effectively controlled with a predetermined temperature and relative humidity.

Another object of the present invention is to provide an air conditioner for a coating booth wherein the amount of the circulating water which flows down the surface of the wet walls is reduced.

Still a further object of the present invention is to provide an air conditioner for a coating booth wherein the temperature difference of the recirculating water between the temperature of the water at the top of the walls and at the lowermost part of the walls is small, even though the amount of the water is not large.

More particularly, the air conditioner of the present invention advantageously includes a heater for heating the air and a humidifier for humidifying the heated air by contacting it with the recirculating water flowing down the surfaces of an article such as a wet wall, and further an atomizer to supply supplementary energy to the flowing water before the air contacts the flowing water.

More concretely, the present invention is so constructed as to intake the air through a filter for eliminating dust, to heat the air by a plate fin coil heater to an extent where it is not in an excessively saturated state, to atomize the steam directly into the air via a steam atomizing tube, to contact the air including the atomized steam with water flowing down the surfaces of the wet walls, to make the recirculating water absorb the steam for giving energy for humidifying to the water, to humidify the air by contacting the flowing water and to feed the humidified air through an eliminator to a coating booth at a temperature controlled by another plate fin coil heater.

The atomization of the steam is preferably performed directly and uniformly into the air before contacting the wet walls, and may be performed by spraying the steam directly toward the wet walls.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
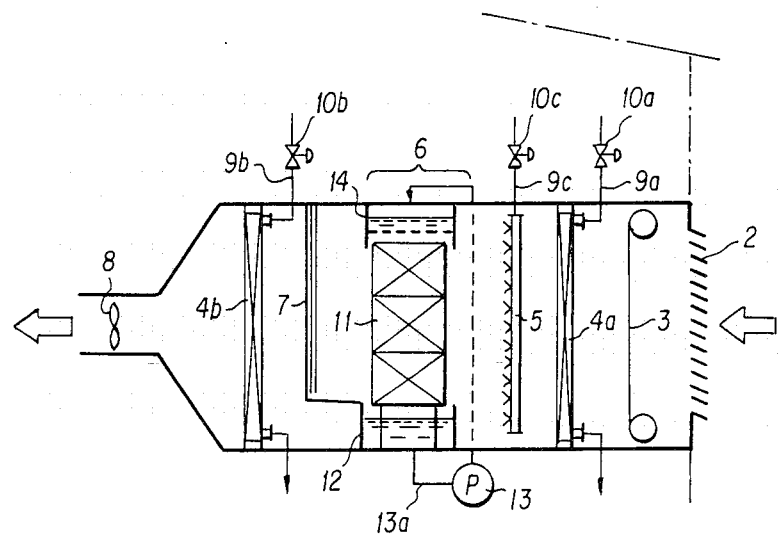
FIG. 1 is a schematic sectional view of the air conditioner according to the present invention.

In FIG. 1, the air conditioner 1, beginning from the right side for intaking the air, consists of a grille 2 forming an air intake port, a filter 3 for removing dust from the intake air, a plate fin coil heater 4a for heating the air, a steam atomizing tube 5 for atomizing steam directly into the air, wet wall units 6 for humidifying the air contacting and passing by, a droplet eliminator 7 for isolating the water droplets scattered into the air by the units 6, a plate fin coil heater 4b for regulating the temperature of the humidified air to a predetermined value, and a fan 8 for feeding the air controlled to the predetermined temperature and humidity into the coating booth (not shown). Further, steam pipes 9a, 9b, 9c are provided for supplying the steam to the plate fin coil heater 4a, the tube 5 and the plate fin coil heater 4b respectively, and each of them has steam valves 10a, 10b and 10c for controlling the amount of steam flow into the respective devices.

In the air conditioner thus constructed, the filter 3 employs a non-woven cloth having approximately 20 mm of thickness, which is extended from an upper roll to a lower roll and is wound from one to the other or vice versa as required. The coils are constructed by attaching fins to pipes through which the steam passes, and are formed in a panel shape. The wet wall units 6 for humidifying the air, and which form a humidifying device, consist of a wet wall material 11 which contributes to delay the flowing down speed of the recirculating water when flowing down from the upper portion, a lower tank 12 for temporarily storing the downwardly flowing recirculating water, a pump 13 for pumping up the recirculating water, and a sprinkling tank 14 for sprinkling the recirculating water uniformly onto the wet wall materials 11. The eliminator 7 is constructed so as to pass the air between a number of bent plates, thereby eliminating the water droplets scattered from the wet wall units into the passing air.

The operation of the air conditioner thus constructed will be described hereafter.

The air is sucked from the grille 2 into the air conditioner 1 by the operation of the fan 8. The dust in the intaken air is eliminated by the filter 3. The air is then heated by the coil 4a to a predetermined temperature. This heating is performed so that the air is not excessively saturated in the next humidifying step. Then steam is atomized from the tube 5 directly into the air. The atomized steam is partly absorbed by the circulating water flowing down on the surface of the wall material 11, and at the same time the temperature of the flowing water is increased correspondingly. Thus, the temperature difference between the flowing water at the upper and lowermost portions of the wet wall is reduced and an equalized humidifying operation is provided because the heat lost in flowing down will be returned by the heat of the absorbed steam. The atomized steam also partly directly humidifies the air.

The air thus humidified by the wet wall units 6 is incorporated with the water droplets of the circulating water scattered into the air by the wall units 6, and passes through the eliminator 7, in which the water droplets are separated from the air. Then, the air is again adjusted by passing through the coil heater 4b to a predetermined temperature and humidity, and is fed to the coating booth.

Figure 3:
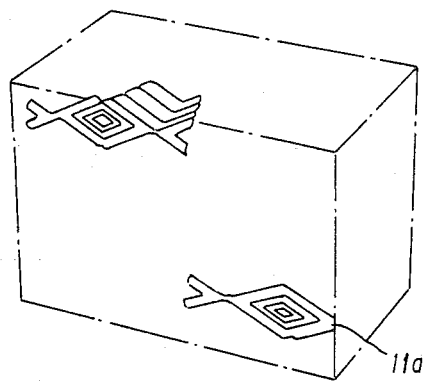
FIG. 3 is a perspective view of one example of the wet wall materials.
Figure 4A:
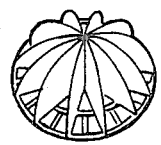
FIGS. 4A to 4D are perspective views of embodiments of the filler for the wet wall units.
Figure 4B:
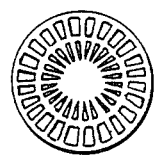
Figure 4C:
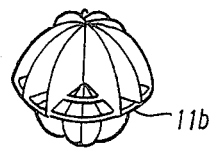
Figure 4D:
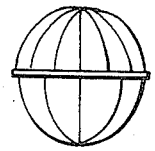

In the humidifying step of this embodiment, the wet wall units 6 are employed as a humidifying means. But any humidifier may be used if it contributes to a delay in the flowing down speed of the recirculating water. Thus, other kinds or shapes of humidifiers may be used, and the type of humidifier is not limited to the wet wall materials 11 of this embodiment. For example, the wall material 11 may be, as shown in FIG. 3, a number of rhombic lattice-shaped or net-shaped materials laminated on the base 11a, or it may be a wet wall formed by assembling disc-shaped fins, as shown in FIG. 4, into a spherical filler 11b within a metal gauze container. Such wet wall units have good air permeability between the units, thereby improving the humidifying effect. In FIG. 1, 13a designates a pipe for feeding the recirculating water to the upper portion via pump 13.

Figure 2:
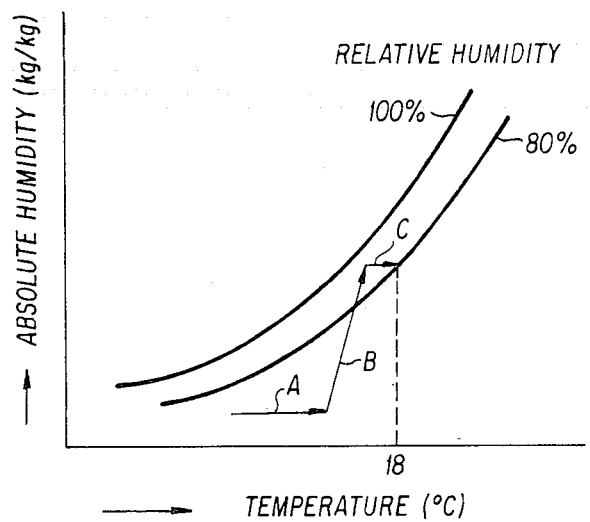
FIG. 2 is an air humidity graph.

The operation described above is performed where the atmospheric air is at a low temperature, for example in winter. The variations in the temperature and humidity of the air in the respective steps are as shown in an air humidity graph in FIG. 2. In this case, the temperature is eventually controlled to 18° C., and the humidity is controlled to 80% (relative humidity). In FIG. 2, an arrow A designates the heating by the coil 4a, an arrow B designates the humidification by the tube 5 and the wall units 6, and an arrow C designates the heating by the coil 4b Since, in the present invention, the steam is atomized directly into the air prior to humidification by the wet walls, the recirculating water flowing down the wet walls have transmitted thereto by absorption of the steam an energy for humidifying the passing air.

Consequently, the temperature difference between the upper portion and the lower portion of the wet walls can be reduced as compared with the conventional method for direct heating in the water storage tank (lower tank 12) of the recirculating water. Accordingly, the recirculating water quantity can be largely reduced.

For example, in the case of an air conditioner for a coating apparatus having an 8,000 m²/min. air flow, the conventional air conditioner requires approximately 8 m²/min of recirculating water flowing down the wet wall units. But according to the air conditioner of the present invention, this quantity can be reduced to 1 m²/min. Thus, a large water storage tank is not necessary, and the power consumption can be largely reduced.

Since the steam is directly atomized in the present invention, the amount of atomized steam and the temperature of the steam can be readily adjusted, and can readily respond to weather variations. In the air conditioner of the present invention, the conventional method of heating the circulating water may also be incorporated into the structure.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An air conditioner for a coating enclosure comprising:

means for drawing air through an air filter;
first means for heating said filtered air;
means for humidifying said heated air by contacting said air with heated water flowing on wet walls;
second means for reheating said humidified air, means for feeding said reheated and humidified air into said coating enclosure, and
steam atomization means provided between, in the direction of flow of said air, said first means for heating the air and said means for humidifying the air, said steam atomizing means being constructed for spraying steam directly toward said wet walls to heat said water.

2. The air conditioner of claim 1 including a heated water reservoir tank and means for recirculating said heated water betweeen said tank and said humidifying means.

3. The air conditioner of claim 1 wherein said atomization means is positioned and constructed for uniformly distributing steam into said flow of air over an area corresponding to the total area of said wet walls.

4. The air conditioner of claim 1, wherein said wet wall units each consist of a set of disc-shaped fins having good air permeability.

5. The air conditioner of claim 1, wherein said wet wall units each consists of a spherical filler having good air permeability.

6. The air conditioner of claim 2, wherein said tank is provided with a heating device.

7. The air conditioner of claim 1 wherein said steam atomizer has a steam flow control valve.

8. A method for conditioning the air of a coating enclosure comprising steps of:
    drawing air through an air filter;
    heating said filtered air;
    flowing water down wet walls;
    atomizing steam directly onto said wet walls in such a manner that the atomized steam contacts water flowing down said wet walls to heat said water;
    humidifying the air by contact with said heated water flowing down said wet walls;
    eliminating the water droplets in the humidified air by means of an eliminator; and
    heating the air again to a predetermined temperature.

* * * * *